United States Patent [19]
Gudmundson et al.

[11] Patent Number: 5,032,707
[45] Date of Patent: Jul. 16, 1991

[54] BAGLESS FILM HANDLING SYSTEM

[75] Inventors: Gunnar G. Gudmundson, Somers, Conn.; Raymond H. Crochetiere, Southampton; John R. Reuss, Westfield, both of Mass.

[73] Assignee: Standard Manufacturing, Chicopee, Mass.

[21] Appl. No.: 308,186

[22] Filed: Feb. 8, 1989

[51] Int. Cl.[5] ............................................ G06F 15/20
[52] U.S. Cl. .................................. 235/375; 235/376; 355/40
[58] Field of Search ...................... 235/376, 375, 385; 355/40, 17; 354/105

[56] References Cited

U.S. PATENT DOCUMENTS 3,733,770 5/1973 Erickson et al. .
3,766,546 12/1973 Erickson et al. .
3,789,571 2/1974 Tall et al. .
3,857,312 12/1974 Carlstedt .
3,933,069 1/1976 Tall et al. .
3,952,871 4/1976 Erickson .
3,967,518 7/1976 Edwards .
3,992,965 11/1976 Hell et al. .
4,025,005 5/1977 Fleck et al. .
4,028,619 6/1977 Edward .
4,029,250 6/1977 Tall .
4,115,981 9/1978 Hell et al. .
4,249,663 2/1981 Hewlett .
4,253,788 3/1981 Oaks et al. .
4,293,215 10/1981 Rosborough ........................ 355/40
4,297,930 11/1981 Putzke .
4,309,600 1/1982 Perry .................................. 235/375
4,411,725 10/1983 Siegel et al. .
4,543,151 9/1985 Aldo .
4,550,246 10/1985 Markman ........................... 235/385
4,688,678 8/1987 Zue et al. .
4,760,574 7/1988 Budworth et al. .
4,783,066 11/1988 Barker et al. .
4,791,279 12/1988 Signoretto .......................... 235/375
4,823,162 4/1989 Renn .................................... 355/40

FOREIGN PATENT DOCUMENTS 0234833 9/1987 European Pat. Off. .

*Primary Examiner*—Harold Pitts
*Attorney, Agent, or Firm*—Lyon & Lyon

[57] ABSTRACT

A bagless film handling system for individualized processing of a customer's film into prints is described. A key aspect of the system is a point-of-sale terminal for customer selection of individualized processing options such as print size, finish, etc., and for customer entry of identification information such as the customer's phone number, which selected options and information is used to prepare a machine and human readable label which is applied directly to the film before transport to the processing laboratory. As a result, the system eliminates the use of bags to send individual film orders to the lab, which bags are used in conventional film handling systems both to transport the films and as a means of conveying the customer's selected processing options and identifying information in human readable form only. The bar coded label further enables other manual steps in the conventional system to be automated, including, inter alia, the sorting of films into batches destined for similar processing, the splicing of the films, and the packaging of the films with their corresponding prints.

8 Claims, 3 Drawing Sheets

FIG. 1c
FIG. 1d
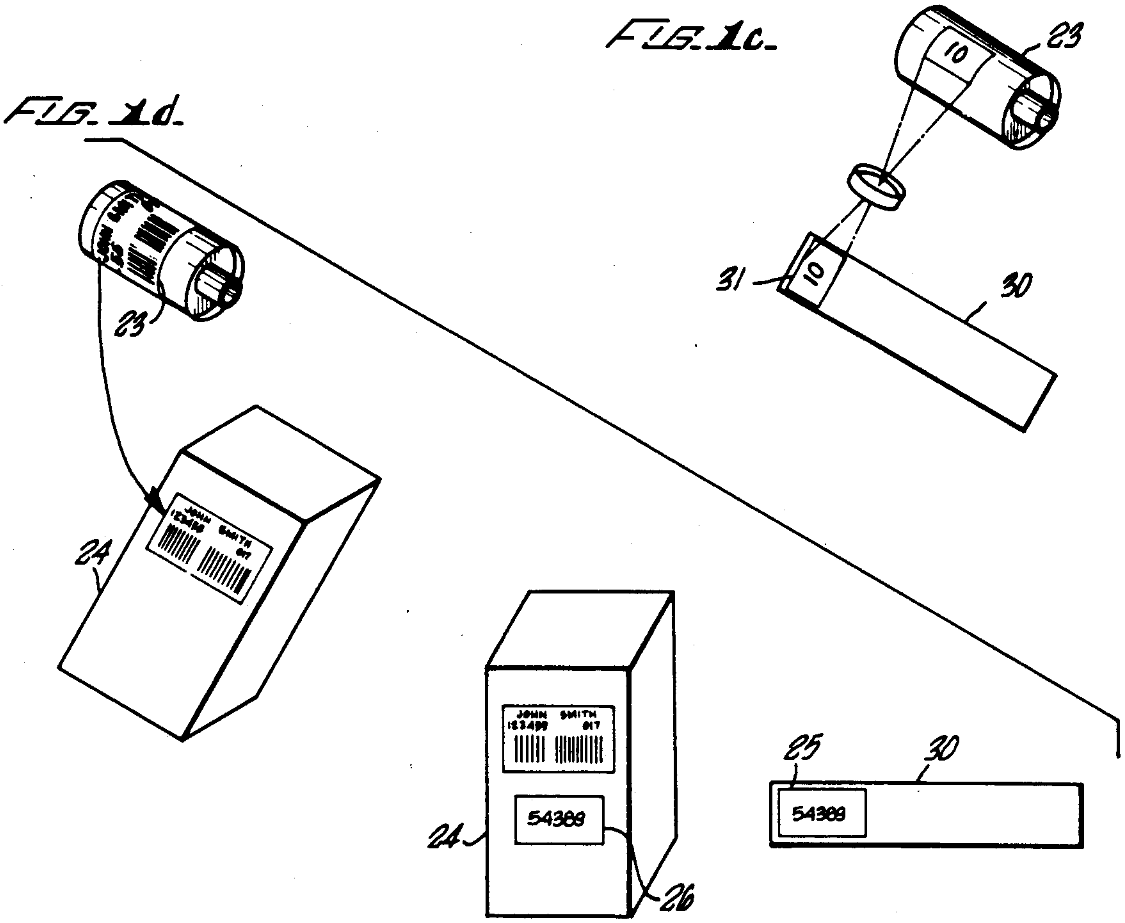
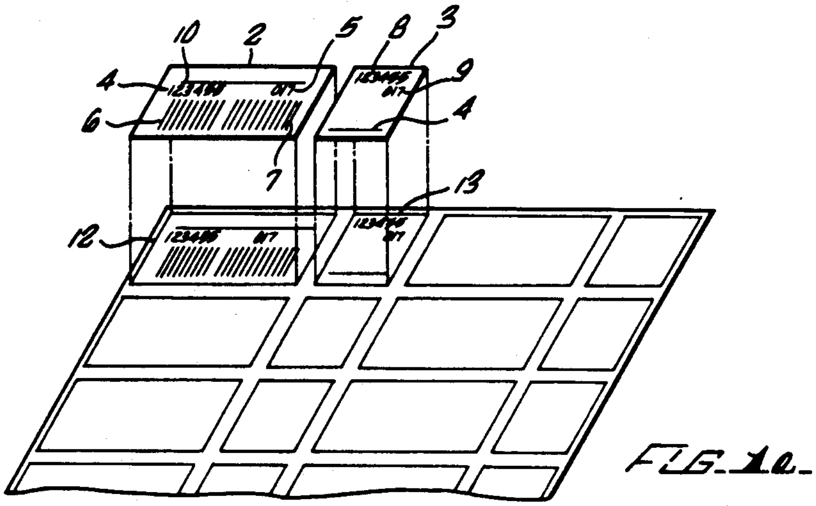
FIG. 1a

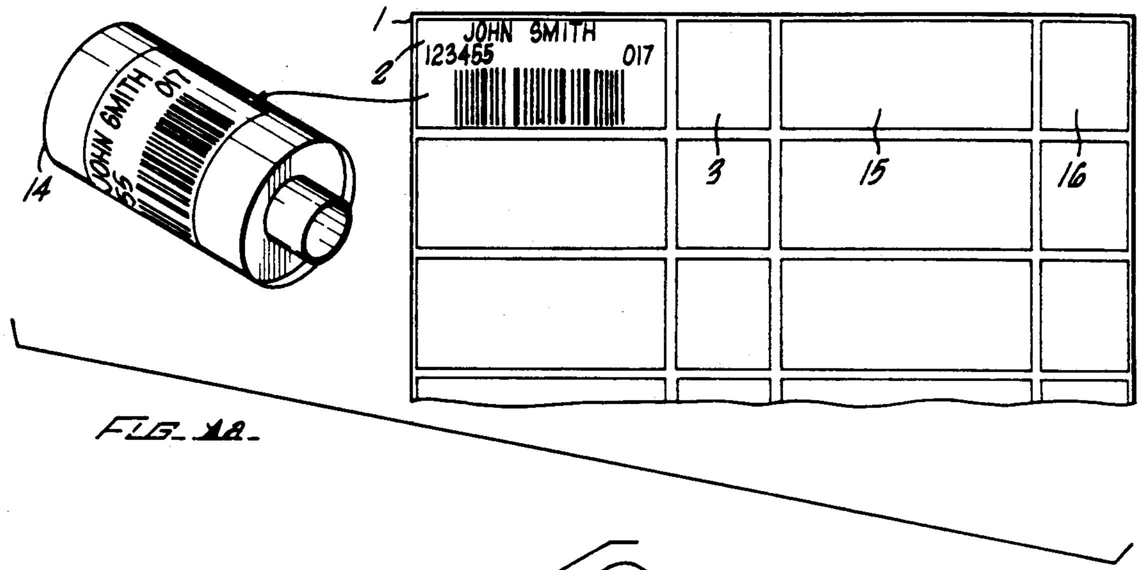
FIG. 18
FIG. 17
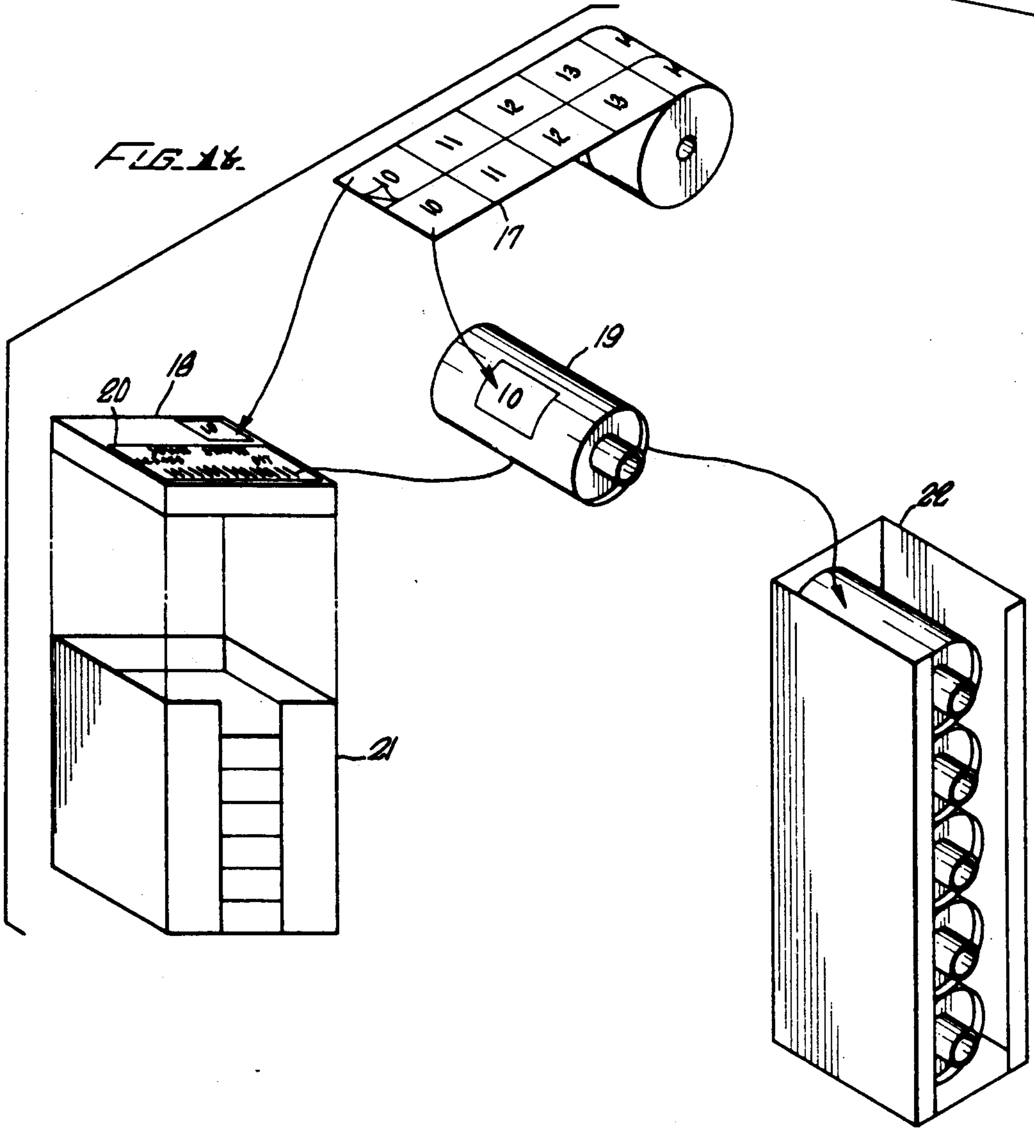

BAGLESS FILM HANDLING SYSTEM

BACKGROUND OF THE INVENTION

1. Field of the Invention

The present invention relates generally to a film handling system which eliminates the need for external bags to convey individual film orders to the processing laboratory, and more specifically, to a system comprising, in part, a point of sale terminal for producing a bar-coded label for placing directly on the film, enabling the film to be transported bagless to the processing laboratory, and enabling other downstream processing steps to be automated.

2. Background Information

In a conventional film handling system, a customer will walk into a dealer location, and submit film for processing. The customer or a clerk at the dealer location will then take a bag with a pre-printed dealer number and order number, write the customer's name, address, and phone number on the bag, check various boxes on the bag to select certain features or processing options, including, inter alia, film size, print size, paper finish, quantity of prints, etc., deposit the film into the bag, and then drop the bag into a box containing other bags of film destined for the processing laboratory. The clerk will also prepare a claim check for the customer, so that the customer can later reclaim his order.

The clerk then normally manually records the transaction on a log sheet by writing the customer name, phone number, and order number on the bag sheet. This information will enable the clerk to reconstruct the transaction later on if the customer loses his claim check, for example.

The bags of film are then shipped to the processing lab, where they are sorted into batches according to the processing options checked on the bags so that films that will be processed similarly will be placed in the same batch. Each batch of films is then typically placed in a plastic barrel for transport to a splicing machine.

At the splicing machine, the films in a particular batch are spliced together using splices having eye readable order numbers, which numbers are the same order numbers printed on the bags for the corresponding films.

The spliced film is then developed and printed onto a roll of print paper, which roll is then exposed. The roll of negatives and corresponding roll of exposed prints are then cut, matched, and packaged manually, and then reinserted into the original bag for return to the dealer and pick-up by the customer.

When the customer initially submits his order, he is handed a claim check which he uses to claim his order. If a customer comes in to claim his order, and the order has not come back from the lab, however, the log sheet is then used to obtain the dealer number and order number for his order, and also, in general, is used to verify that the particular customer, in fact, placed the order in the first instance. If so, the dealer and order number are used to make an inquiry at the lab regarding the status of the order.

The conventional system described above is almost entirely manual, and is therefore labor intensive, low productivity, slow, and a bottleneck in photofinishing. Specifically, the filling out of information on the customer's order bag, the placing of the film into the bag, the logging of a transaction onto a log sheet, the sorting of orders into batches, and the feeding of film orders into the splicer at the processing laboratory are all manual steps and hence inefficient steps in the system.

Accordingly, an object of the present invention is to provide a bagless film handling system which eliminates the use of order bags to convey film orders to the processing lab by automatically producing a label with machine readable order information for placing directly on the film for transport to the lab, which enables the film orders to be transported to the lab without being placed in individual bags, and which further automates the steps of logging transactions into the log sheet, sorting orders into batches, and feeding film batches into the splicer.

Additional objects and advantages of the invention will be set forth in the description which follows or may be learned by practice of the invention.

SUMMARY OF INVENTION

To achieve the foregoing objects, and in accordance with the purpose of the invention as embodied and broadly described herein, there is provided a bagless film handling system comprising, in part, a point of sale terminal for customer entry of order information, automatic logging of the order information into a film log, and automatic production of a machine-readable label printed with the order information for placing directly onto the film before transport to the processing lab. The system further comprises an automatic sorter, an automatic film splicer, an automatic packer, and a batch management computer (BMC). The sorter reads and decodes the order information from the labels attached to the film orders, and sorts the film orders into batches based on the decoded order information so that film orders with similar processing requirements are placed in the same batches. Each batch is then placed in a transportable magazine for transporting to the film splicer. The film splicer splices the film orders for a batch together by applying splices containing machine-readable splice numbers to successive film orders, and also transmits data to the BMC, which maintains files indicating which orders are associated with which splice numbers. The film is then printed onto a roll of prints. The packer then cuts the spliced film into strips, and the print roll into individual prints, and then loads the film strips and prints for a particular order into a "wallet". The packer is described in more detail in the related application "Photofinishing Packaging System," U.S. patent application Ser. No. 018,097, which is herein incorporated by reference as though set forth in full herein. The packer then produces a label printed with the order information which is attached to the wallet. The wallet is then returned to the dealer where it can be claimed by the customer presenting the claim check.

BRIEF DESCRIPTION OF THE DRAWINGS

FIGS. 1(A), 1(B), 1(C), 1(D), and 1(E) are illustrations of a prior art film handling system.

DESCRIPTION OF THE PREFERRED EMBODIMENT

Figure 2:
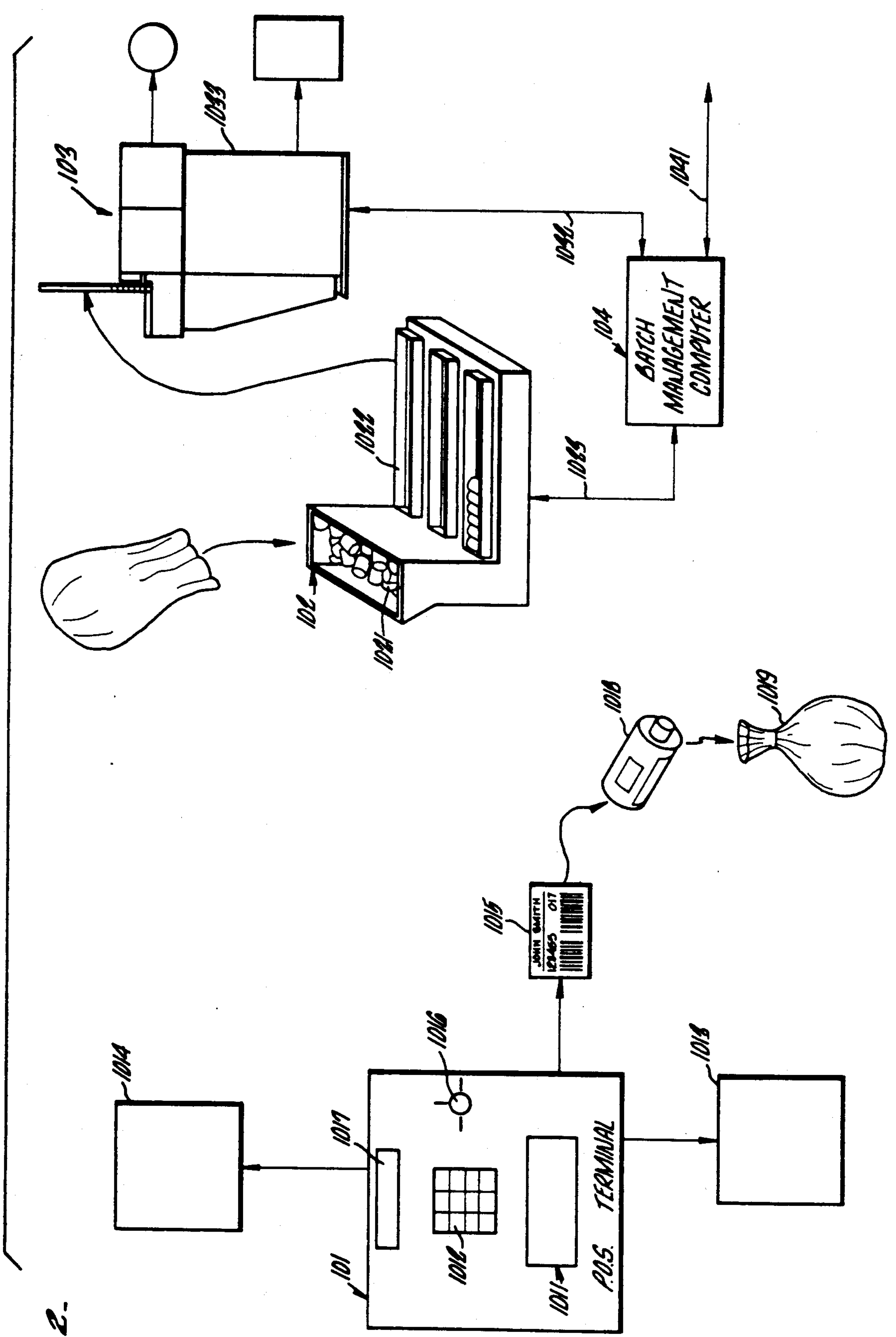
FIG. 2 is an illustration of an embodiment of the subject invention.

A limited bagless film handling system developed by Kodak for slide film only is illustrated in FIGS. 1(A), 1(B), 1(C), 1(D), and 1(E).

As illustrated in FIG. 1(A), a key aspect of the system is pre-printed label stock 1, which is pre-printed with a plurality of peelable labels 2 and corresponding claim checks 3. With reference to FIG. 1(E), each label is pre-printed with a dealer number and an order number in human and machine readable (bar code) form. In FIG. 1(E), the human readable dealer and order numbers are identified with reference numbers 4 and 5 respectively, and the machine readable dealer and order numbers, with reference numerals 6 and 7 respectively. Each corresponding claim check is pre-printed with the dealer and order number in human readable form only. In FIG. 1(E), the claim check dealer and order numbers are identified with reference numerals 8 and 9, respectively. In addition, the pre-printed label stock has a carbon-copy backing, such that when the labels and corresponding claim checks are printed with the machine and human readable dealer and order numbers, a carbon copy of these numbers, in both human and machine readable form, will be produced on that portion of the backing directly underneath the label or corresponding claim check. In FIG. 1(E), the carbon copy for label 2, and the carbon copy for claim check 3, are identified with reference numerals 12 and 13 respectively.

Each label also has a blank line, identified with reference numeral 10 in FIG. 1(E), for writing the customer's name and/or address. In addition, each claim check also has a blank line, identified with reference numeral 11 in FIG. 1(E), for writing the date of the transaction.

As indicated earlier, the labels and claim checks are peelable, and when peeled off the backing, will expose the carbon copies. The carbon copies will be kept by the dealer in a log book, and will constitute the log sheet for the transactions. In FIG. 1(E), the carbon copies for label 2 and claim check 3 are identified with reference numerals 12 and 13 respectively.

As indicated in FIG. 1(A), when a customer submits film 14 for processing, his name and/or address is written on label 15, the date is written on claim check 16, and the label is peeled off and placed on film 14, leaving the carbon copy for placing in a log book at the store. Claim check 16 is also peeled off and given to the customer.

The labelled films are then transported to the processing lab. At the processing lab, a bag or box, which will be used to return the film and associated slides to the customer, is matched with the film. As indicated in FIG. 1(B), if splicing is to be performed in the dark at the lab, film 19 is matched with bag/box 18 by applying pre-printed labels 17 to both, which labels are pre-printed with the same splice number. In addition, the pre-printed label applied to the film at the counter, identified by reference numeral 20 in FIG. 1(B), is removed from the film and applied to the bag/box. The bags/boxes are then stacked in stack 21, and the films are manually stacked in stack 22 in the same sequence as the bags/boxes.

Next, many films are spliced together by the splicer. As indicated in FIG. 1(C), to distinguish each film order in the spliced film roll, the splicer photographs pre-printed label 23, applied earlier to the film casing and pre-printed with a splice number, to create an image 31 of the label on film 30. Later on, during packaging, the splice number from the image is compared with that on the pre-printed label applied to the bag/box to make sure there is a match.

The roll of spliced film is then developed, after which the developed roll is notched by a notcher or notching machine. This notcher scans the image area of the films and determines the center of each image. The machine then makes a small notch in the edge of the film to identify each frame. The purpose of the notches is to allow a mounter to properly cut and position the images of the film for mounting into individual slides. The roll of notched film and the corresponding stack of order bags/boxes are delivered to the packaging area of the lab for manual packaging. In this step, the film is cut and mounted into slides and the slides are then placed into the corresponding order bag/box for return to the customer. As discussed earlier, during packaging, the splice number on the film strips for an order is compared with the splice number on the pre-printed label on the bag/box to see if they match. If they match, a price is calculated and printed on the box/bag, and the box/-bag is returned to the dealer for pick-up by the customer holding the claim check for the order. If the customer has lost the claim check, the log book can be used to verify that the particular customer placed the order, and to obtain the order number itself, which will be used to retrieve the corresponding bag/box for the customer.

In the case where splicing is performed in the daylight, the processing of the films differs from that described above. First, as illustrated in FIG. 1(D), the pre-printed label applied to film casing 23 at the dealer counter is removed, and placed on corresponding bag/-box 24. Then, the film casing is placed inside the bag/-box, which in turn, is sent to the splicing area. Next, instead of applying matching pre-printed labels to the film and corresponding bags/boxes, the same splice numbers are printed on both the bags/boxes and the corresponding films. As illustrated in FIG. 1(D), sequence number 25 printed on the film splice is the same as sequence number 26 printed on the bag/box.

Otherwise, processing and packaging proceeds as before. During packaging, the printed sequence number on the film is compared with that printed on the bag/-box to make sure they match.

The bagless system described above is limited since it only handles slides, not prints, which, unlike slides, can have widely different processing requirements from order to order. As a result, the above system will not work for prints since there is no provision for customer-individualized processing options, nor is there any sorting steps before splicing which will sort the films into batches destined for similar processing. This is in spite of the fact that the above system has been used to process slides for over 10 years, and the need for a bagless film handling system for the processing of individualized prints has existed equally as long. Also, the logging and splicing steps are still manual in the above system, with the associated bottlenecks, slowness, low productivity, and labor intensiveness involved.

The bagless film handling systems of the subject invention is illustrated in FIG. 2. As illustrated, the system comprises point of sale ("POS") terminal 101, automatic sorter 102, automatic splicer 103, batch management computer (BMC) 104, a printer (not shown), and a packer (not shown).

POS terminal 101, in turn, comprises keyboard 1011 (or other similar device) for customer selection of print size, paper, discount coupon, type, finish, etc.; telephone keypad 1012 for customer entry of his phone number, which selections are formatted by the terminal into a product code; printing means 1013 for producing a customer receipt containing dealer location, order number, product description and code, and other possible marketing information; memory means (not shown) for storing the phone number, order number, and product code for the orders left for processing; printing means 1014 for producing a hard copy log sheet of orders received each day, preferably in numerical order by order number or phone number; means 1015 for printing and/or applying a label to the film orders, the label containing both a machine readable and eye readable dealer number, order number, and product code; mode select key switch 1016 to select one of several modes of operation for the POS terminal, including "normal", "inquire", and "log sheet print out" modes; display 1017 to give prompts and confirmation of data keyed in, and in the "inquire" mode, to display customer information retrieved from memory; and optional signature capture means (not shown) for capturing a record of the customer's signature, either hardcopy or digital capture.

Sorter 102 comprises infeed hopper 1021 into which the films are emptied as they are received at the processing laboratory; a scanning device (not shown) for reading and decoding the various bar codes on the labels which are applied to the film at the POS terminal; programmable control means (not shown) for sorting the films into various batches destined for similar processing depending on compatible product bar codes printed on the labels applied at the POS terminal; and a plurality of transportable magazines 1022, one magazine for each batch of compatible product codes, into which the films are sorted.

Splicer 103 comprises receptacle 1031 for the transportable film magazines; means (not shown) for scanning and decoding the various bar codes on the labels applied to the film; a film opening and splicing mechanism (not shown); means (not shown) for applying bar coded splices to the films containing bar coded splice numbers; optional printing means 1033 for printing a hard copy record of batch data descriptive of the batches of films sorted into the various magazines; and control means (not shown) for combining the data scanned from the film orders with the bar coded splice numbers on the splices and with other information produced by the splicer such as direction of film wind, etc., and transmitting the information to batch management computer (BMC) 104 which maintains files relating batch numbers, splice numbers, and the corresponding dealer and order numbers.

As illustrated in FIG. 2, the BMC is coupled to the sorter, which link is identified with reference numeral 1023, and is also coupled to the splicer, which link is identified with reference numeral 1032. As illustrated, the BMC is also coupled to the packaging station by means of link 1041, which will be described later. The BMC also maintains files indicating which product codes can be batched together for similar processing, and relates that information by means of link 1023 to the sorter, which will sort all films having compatible product codes into the same magazine. In addition, as discussed above, the splicer transmits information relating splice numbers to dealer and order numbers by means of link 1032 to the BMC.

The spliced film is then developed and notched at the center-line between successive images to facilitate centering of the images by the printer. The printer then prints the images of the film onto a roll of print paper, and an attachment to the printer, which attachment is described in copending U.S. patent application Ser. No. 018,097, which is incorporated by reference as through set forth in full herein, scans and decodes the bar-coded splice numbers from the film splices, and encodes them onto the roll of print paper by selectably making notches at the upper or lower edges of the paper at the boundaries between successive prints.

The packaging subsystem or packer comprises a film cutter for cutting the spliced film into strips, including means for scanning and decoding the bar codes on the splices of the spliced film; a print cutter for cutting the print roll into individual prints; a label printer; and control means coupled to the BMC by means of link 1041 for communicating the scanned splice bar code data and the quantity of prints (obtained from the print cutter) to the BMC, which data will be used by the BMC to determine pricing, and for receiving the dealer number, order number, price, and possible other promotional information from the BMC for printing it on a label in human readable form (by means of the label printer), and optionally in the form of a bar code usable for automatic sorting. The label is then placed on a "wallet" into which the films and prints are loaded for return to the customer.

The operation of the system will now be described. The POS terminal is located such that the customer has access to it. The customer uses the product data entry keypad to enter individualized data about the processing such as film size, print size, paper finish, quantity of points, each and any discount coupons, etc. In addition, on the telephone keypad, the customer keys in his telephone number or other possible identification number. The terminal also optionally captures the customer's signature either in hardcopy (by means, of for example, an NCR payee roll) or digitally.

Alternatively, instead of key pads, a pressure sensitive pad is used to obtain a hardcopy record of the entire transaction in the customer's handwriting. The pad picks up the pressure applied by the customer's handwriting, and based on the location at which the pressure is applied, activates electronic signals within the terminal as if a key board were being pressed.

The individualized processing data is then formatted into a numerical product code by the control means of the POS terminal. The control means then produces a label containing the following:

- a bar code and eye readable number identifying the dealer or location of the POS terminal
- a bar code and eye readable order number, which number is generated from a sequentially incremented list of numbers kept within the POS terminal
- a bar code and eye readable product code, which identifies the type of individualized processing required, and possible discount coupon information, for the film This label is then either manually or automatically applied to the film, which film is then placed in a container along with other labelled films for transport to the processing laboratory. With reference to FIG. 2, label 1015 is applied to film 1018, which is then placed in bag 1019 (along with other film orders) for transport to the lab.

The POS then produces a customer receipt, identified by reference number 1013 in FIG. 2, confirming the order and telling the customer what the order number is for reclaiming purposes.

In addition to the above, the POS terminal stores all of the above information in memory for possible future use in rematching the order to the customer if the customer has lost his receipt by the time he attempts to reclaim his finished order.

When the container of films is received at the lab, it is emptied into a high speed automatic sorting machine that sorts the films into batches according to the product bar codes on the films. The batches of sorted films are then collected in magazines, one batch per magazine.

The magazines are then transported to the splicer, where a machine tender loads each magazine onto the splicer, and starts processing the batch of film in that magazine. The splicer scans the bar coded label on each film, and then feeds each film automatically for splicing. To splice the film, the splicer applies a bar coded splice to the film attaching it to the previous film, containing a bar coded splice number. The splicer then sends a string of data to the BMC, which data, in an exemplary embodiment, comprises dealer number, order number, splice number, product code, film wind direction, film length, etc. This data is assembled in files in the BMC which are maintained for relating which splice numbers are associated with which order and dealer numbers.

The spliced film is then developed, notched, and exposed onto a roll of print paper. In addition, the splice bar code numbers from the splices are decoded by the printer, and encoded onto the roll of print paper by selectively notching the edges of the print paper as described in U.S. patent application Ser. No. 018,097. The exposed print roll is then developed.

The processed spliced film and print roll are then loaded onto the packaging subsystem or packer. The packer cuts each order of film and prints by means of the film and print cutter, respectively, into film strips and individual prints associated with each splice number. As each splice is cut, the packer scans and decodes the bar-coded splice number, and checks for a match between the encoded number notched into the prints and the bar coded splice number associated with the film strips. If they match, the splice number and the number of prints (obtained from the print cutter) are sent to the BMC. Using the splice number, the BMC retrieves the dealer number, order number, and product code associated with that splice number.

The BMC is coupled to a host computer (not shown) which contains pricing algorithms. The BMC sends relevant information for pricing a particular order (such as the dealer number, product code, and number of prints) to the host computer, which computes a price based on this information, and then sends the price back to the BMC. The BMC then sends the price, dealer number, and order number back to the packer.

The packer then prints a label containing the dealer number, order number, and price in eye readable format, and optionally machine readable bar code format in the case of automated sorting or UPC pricing applications.

The cut prints and cut film strips for an order are loaded into the wallet, and the wallet is then closed, and sealed by the label.

The wallets are then sorted by dealer number, either manually or by machine, in the latter instance, using the bar coded dealer number, and the sorted wallets split up and sent back to the dealers.

When the wallets are received at the dealer's counter, they can be further sorted in numerical order based on the order number. If a customer comes in with his order receipt, the wallet can be located with the order number printed on the label. If the customer does not have his receipt, the mode select key switch on the POS terminal can be switched to "inquiry" mode, and the customer can then enter his phone number into the terminal, which will then display his order number. If the entire system has gone down, the hard copy log sheet can be used to retrieve his order number.

Another case is if no one picks up a particular order. In this instance, a clerk of the dealer's will again put the terminal into "inquiry" mode, but will key in the dealer number and order number. The terminal will then display the customer's phone number, which can be used to call the customer to notify him of the receipt by the dealer of the order.

Optionally, as discussed earlier, if a pressure sensitive pad is added to the POS terminal, a hard copy record of every transaction in each customer's handwriting, including the customer's signature, will be available to find the customer's order number in the case where the customer has lost his claim check. As mentioned earlier, the hard copy can be accessed if the entire system has gone down to either verify the initial placement of the order by the customer or to obtain the order number. Also, in the case where signature capture only is performed, the customer's signature can be used to verify the placement of the order by the particular customer.

What is claimed is:

1. A bagless film handling system for individualized processing of customers' individual films into prints according to selected processing options, the films being contained in corresponding cartridges, comprising:

a point-of-sale terminal for selecting the processing options, and for producing machine readable labels coded with selected options and also coded with identification indicia for associating the individual films with the customers, which labels are directly applied to the corresponding film cartridges containing the films;

a sorter for scanning the processing options from the machine readable labels on the film cartridges, and automatically sorting the film cartridges into batches destined for similar processing based on said selected options;

a splicer for removing the films in a batch from their corresponding cartridges, automatically splicing the films of the batch using machine readable splices coded with splice numbers, for scanning the splices used to splice the films of the batch to provide the splice numbers for the films in the batch, for scanning the labels applied to the film cartridges corresponding to the films in the batch to provide the identification indicia for the films in the batch, and for associating the splice numbers for the films in the batch with the identification indicia for the same films;

a printer for printing the films in a batch onto a print roll, each film in the batch being printed onto corresponding individual prints in the print roll, for scanning the splices used to splice the films in the batch to obtain the splice numbers coded onto the splices, and encoding the splice numbers for the films in the batch onto the corresponding individual prints in the print roll;

a packer for cutting the spliced films of a batch into individual films, for cutting the print roll for the batch into individual prints, for matching the individual films with the corresponding individual prints produced from the film by scanning the splice number from the film, by decoding the splice number from the corresponding prints, and matching the same, for loading the individual films and corresponding prints into wallets, for obtaining the identification indicia associated with the splice numbers, and associating the wallets with the customers using the identification indicia; and at least one control computer coupled to the sorter, the splicer, and the packer for (a) receiving and storing data from the splicer associating the splice numbers with the identification indicia; (b) transmitting said data to the packer for associating the wallets with the customers; and (c) transmitting data to the sorter indicating which film cartridges should be batched together for similar processing.

2. A bagless film handling method for individualized processing of customers' individual films into prints according to selected processing options, the films being contained in corresponding cartridges, comprising the steps of:

selecting the processing options;

producing machine readable labels coded with selected options and also encoded with identification indicia for associating the individual films with the customers;

applying the labels directly to the film cartridges containing the films;

scanning the machine readable labels on the film cartridges to obtain the selected processing options;

automatically sorting the film cartridges into batches destined for similar processing based on the selected options;

removing the films in a batch from their corresponding cartridges;

automatically splicing the individual films of the batch together using machine readable splices coded with splice numbers;

scanning the labels applied to the film cartridges to obtain the identification indicia for the films;

associating the splice numbers for the films with the identification indicia for the same films;

storing the associated splice numbers and identification indicia;

developing and printing the spliced films of a batch onto a corresponding print roll, each film in the batch being printed onto corresponding individual prints in the print roll;

scanning the splices for the films in a batch to provide the splice numbers for the films in the batch, and encoding the numbers onto the corresponding individual prints for the films;

cutting the spliced films in a batch into individual films and cutting the corresponding print roll for the batch into the individual prints corresponding to the films;

matching the individual films with the corresponding individual prints produced from the films by decoding the numbers from the prints, by scanning the splice numbers from the individual films, and matching the same;

loading the films and the matching corresponding prints into wallets;

obtaining the identification indicia associated with the splice numbers on the films utilizing the associated splice numbers and identification indicia; and associating the wallets with the customers utilizing the identification indicia.

3. A bagless film handling system comprising:

a point-of-sale terminal for selecting processing options for customers' films contained in corresponding cartridges, and for producing machine readable labels coded with such selected options, also coded with dealer numbers and customer identification indicia, which are directly applied to the cartridges containing the films;

a sorter for scanning the labels applied to the cartridges to obtain the machine readable processing options for the films contained in the cartridges, and automatically sorting the cartridges containing the films into batches destined for similar processing based on said selected options;

a splicer for removing the films in a batch from their corresponding cartridges, for automatically splicing the films of a batch together using machine readable splices coded with splice numbers, for scanning the splices used to splice the films of a batch to provide the splice numbers for the films in the batch, for scanning the labels applied to the films in the batch to provide the dealer numbers and customer identification indicia for the films in the batch, and for associating the splice numbers for films in the batch with the dealer numbers and customer identification indicia for the same films;

a printer for printing the spliced films in a batch onto a print roll, each film in the batch being printed onto corresponding individual prints in the print roll;

a packer for cutting the spliced films of a batch into individual films, for matching the individual films with the corresponding individual prints produced from the film by scanning the splice numbers from the films, by decoding the splice numbers from the corresponding prints, and matching the same, for loading the individual films and corresponding prints into wallets, for obtaining the dealer numbers and customer identification indicia associated with the splice numbers for the films, and associating the wallets with the customers using the customer identification indicia and dealer numbers; and at least one control computer coupled to the sorter, the splicer, and the packer for (a) receiving and storing data from the splicer associating the splice numbers with the dealer numbers and customer identification indicia; (b) transmitting said data to the packer for associating the wallets with the customer identification indicia and the dealer numbers; and (c) transmitting data to the sorter indicating which film cartridges should be batched together for similar processing.

4. The system of claim 3 wherein the sorter automatically sorts the cartridges containing the films into transportable magazines, and the splicer automatically unloads the film cartridges in a magazine and splices the films contained in the cartridges.

5. The system of claim 4 wherein the point-of-sale terminal contains means for a customer inputting customer-specific information, and the terminal is adapted to merge the customer identification indicia with the customer-specific information to obtain merged data, to store the merged data, and to automatically produce a film log of orders from the merged data.

6. A bagless film handling method comprising the steps of:

selecting processing options for customers' films contained in corresponding cartridges;

automatically preparing machine-readable labels coded with such selected options, and also coded with dealer numbers and customer identification indicia, and applying the labels to the cartridges containing the films;

scanning the labels to obtain the selected processing options, and automatically sorting the cartridges containing the films into batches based on such selected options;

removing the films in a batch from their corresponding cartridges and automatically splicing the films of the batch together using machine readable splices coded with splice numbers;

scanning the splices used to splice the films of a batch to provide the splice numbers for the films in the batch;

scanning the labels applied to the cartridges corresponding to the films in the batch to provide the dealer numbers and customer identification indicia for the films in the batch;

associating and storing the splice numbers for the films in the batch with the dealer numbers and customer identification indicia for the same films;

printing the spliced films in a batch onto a print roll, each film in the batch being printed onto corresponding individual prints in the print role;

cutting the spliced films of a batch into individual films;

cutting the print roll for the batch into individual prints;

matching the individual films with the corresponding individual prints produced from the films by scanning the spice numbers from the films, decoding the numbers from the corresponding prints, and matching the same;

loading the individual films and corresponding prints into wallets;

obtaining the dealer numbers and customer identification indicia associated with the splice numbers for the films; and associating the wallets with the customers using the customer identification indicia and the dealer numbers.

7. The method recited in claim 6 further comprising the steps of:

inputting customer-specific information;

merging and storing the customer-specific information with the customer identification indicia to produce merged data; and automatically producing a film log of orders from the merged data.

8. The method recited in claim 7 further comprising the steps of:

sorting the cartridges containing the films into transportable magazines; and automatically unloading the cartridges in a magazine, and splicing the films contained in the cartridges.

* * * * *